(12) United States Patent
Sasaki et al.

(10) Patent No.: US 10,392,048 B2
(45) Date of Patent: Aug. 27, 2019

(54) POWER STEERING DEVICE AND CONTROL DEVICE THEREFOR

(71) Applicant: HITACHI AUTOMOTIVE SYSTEMS, LTD., Hitachinaka-shi, Ibaraki (JP)

(72) Inventors: Mitsuo Sasaki, Hadano (JP); Makoto Goto, Isehara (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 67 days.

(21) Appl. No.: 15/549,472

(22) PCT Filed: Jan. 13, 2016

(86) PCT No.: PCT/JP2016/050829
§ 371 (c)(1),
(2) Date: Aug. 8, 2017

(87) PCT Pub. No.: WO2016/136308
PCT Pub. Date: Sep. 1, 2016

(65) Prior Publication Data
US 2018/0022379 A1    Jan. 25, 2018

(30) Foreign Application Priority Data

Feb. 27, 2015    (JP) ................ 2015-037542

(51) Int. Cl.
*B62D 5/04*    (2006.01)
*B62D 5/00*    (2006.01)
*B62D 3/12*    (2006.01)

(52) U.S. Cl.
CPC ........... *B62D 5/0484* (2013.01); *B62D 3/126* (2013.01); *B62D 5/0448* (2013.01); *B62D 5/0463* (2013.01); *B62D 5/0481* (2013.01)

(58) Field of Classification Search
None
See application file for complete search history.

(56) References Cited

U.S. PATENT DOCUMENTS

| | | | | |
|---|---|---|---|---|
| 4,556,116 A * | 12/1985 | O'Neil | ................ | B62D 5/0415 180/404 |
| 4,771,845 A * | 9/1988 | Shimizu | ............... | B62D 5/0463 180/446 |
| 6,326,753 B1 * | 12/2001 | Someya | ............... | B62D 5/0463 180/443 |
| 6,456,946 B1 * | 9/2002 | O'Gorman | ........... | B62D 5/0487 702/58 |
| 2016/0001815 A1 | 1/2016 | Sasaki | | |

FOREIGN PATENT DOCUMENTS

| | | |
|---|---|---|
| JP | H11-059469 A | 3/1999 |
| JP | 2006-111032 A | 4/2006 |
| JP | 2008-037255 A | 2/2008 |
| JP | 2008-168728 A | 7/2008 |
| WO | WO-2014/148086 A1 | 9/2014 |

\* cited by examiner

Primary Examiner — Adam D Tissot
(74) *Attorney, Agent, or Firm* — Foley & Lardner LLP

(57) ABSTRACT

Disclosed is a power steering device 1 having a control unit 33 equipped with an abnormality detection circuit 50. The abnormality detection circuit 50 is configured to judge the occurrence of an abnormality in the power steering device when a peak level Trp of a frequency component of a steering torque Tr etc. that periodically changes in a frequency range of 20 to 25 Hz becomes higher than a predetermined value.

19 Claims, 9 Drawing Sheets

FIG.5
(a)
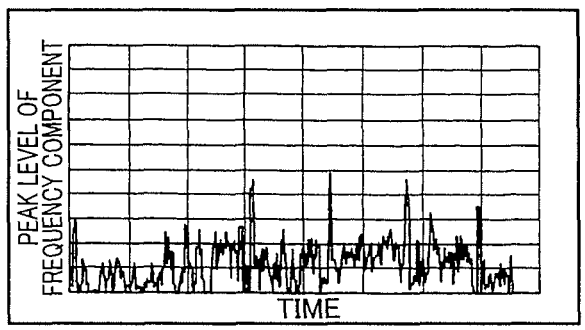
FREQUENCY: 20-25 Hz
(STEERING SPEED: 30 deg/sec)
(b)
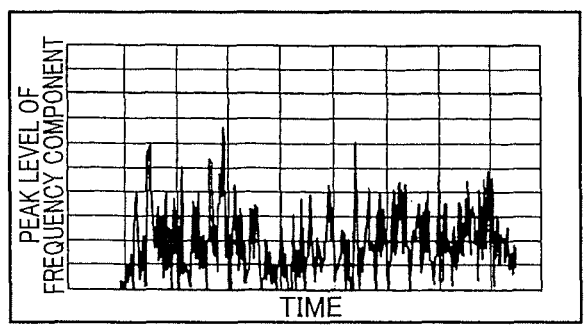
FREQUENCY: 20-25 Hz
(STEERING SPEED: 30 deg/sec)

POWER STEERING DEVICE AND CONTROL DEVICE THEREFOR

FIELD OF THE INVENTION

The present invention relates to a power steering device for a vehicle, and a control device therefor.

BACKGROUND ART

Patent Document 1 discloses a power steering device in which a water drop sensor is disposed on the inner circumference of an end portion of a gear housing such that, when the water drop sensor detects water drops adhered to a rack bar, a vehicle driver would be informed of the occurrence of an abnormality in the power steering device.

PRIOR ART DOCUMENTS

Patent Document

Patent Document 1: Japanese Laid-Open Patent Publication No. 2006-111032

SUMMARY OF THE INVENTION

Problem to be Solved by the Invention

In the power steering device of Patent Document 1, however, the water drop sensor needs to be additionally provided to detect the abnormality due to the entry of water drops. The use of such an additional water drop sensor leads to an increase of device cost and complication of abnormality detection circuit configuration.

Means for Solving the Problems

The present invention provides a power steering device having an abnormality detection circuit configured to use a steering torque, a command signal for an electric motor or an electric current flowing in the electric motor as steering force information and judge the occurrence of an abnormality in the power steering device when a value of the steering force information periodically changes in a predetermined frequency range, which is higher than or equal to a first frequency and lower than or equal to a second frequency, and the value of the steering force information in the predetermined frequency range becomes higher than a predetermined value.

Effects of the Invention

In the present invention, the state in which the value of the steering force information in the predetermined frequency range is higher than the predetermined value is detected as the device abnormality. The device abnormality can be thus accurately detected on the basis of changes in the steering force information value, without the use of an additional structural component part such as water drop sensor.

In other words, the device abnormality is judged as occurring when the value of the steering force information in the predetermined frequency range increases and becomes higher than the predetermined value due to the occurrence of rust in the steering unit. It is therefore possible to achieve accurate detection of the device abnormality.

BRIEF DESCRIPTION OF DRAWINGS

FIG. 5(a) is a graph of data showing experimental results of the power steering device when equipped with a new ball-screw mechanism and tested on a laboratory bench; and FIG. 5(b) is a graph of data showing experimental results of the power steering device when equipped with a rusted ball-screw mechanism and tested on a laboratory bench.

DESCRIPTION OF EMBODIMENTS

Hereinafter, a power steering device 1 according to an exemplary embodiment of the present invention will be described in detail below with reference to the drawings.

Figure 1:
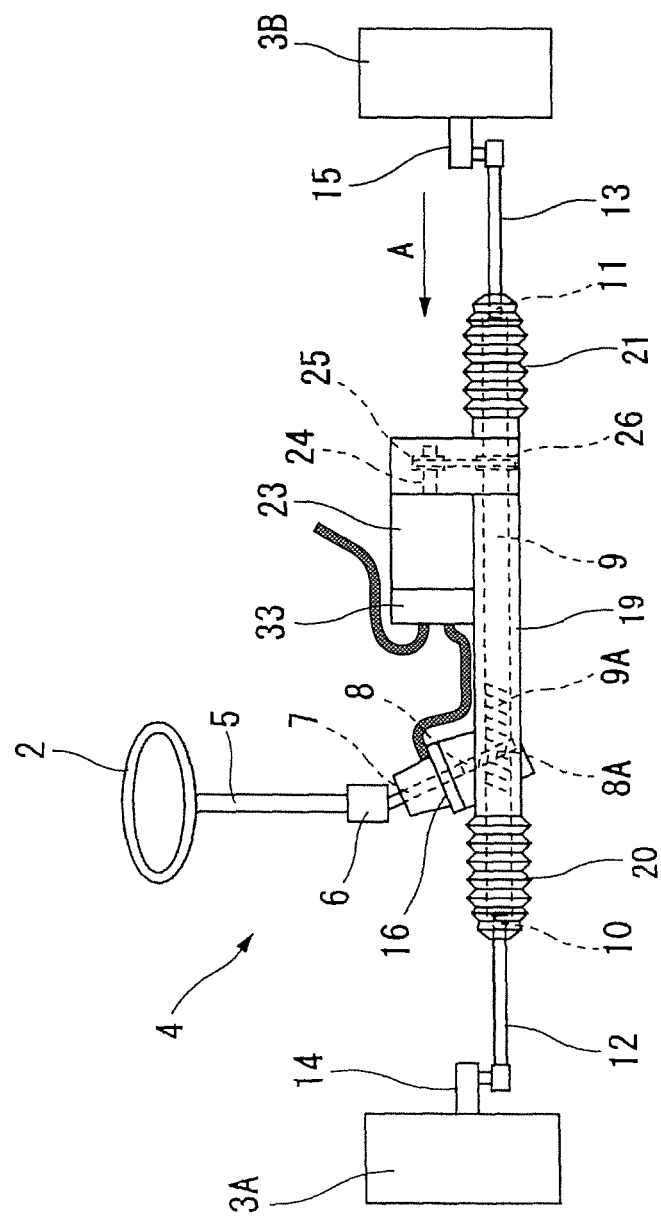
FIG. 1 is a schematic view showing an example of a power steering device according to the present invention.
Figure 2:
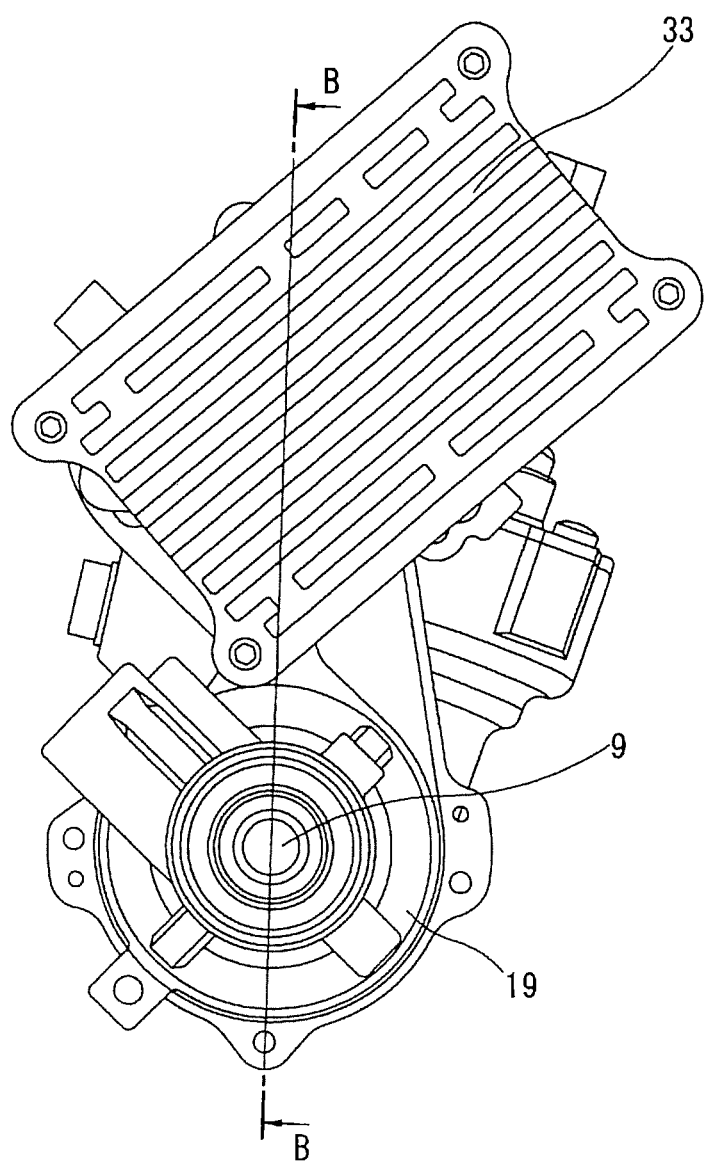
FIG. 2 is a perspective view of the power steering device as viewed in the direction of an arrow A of FIG. 1.
Figure 3:
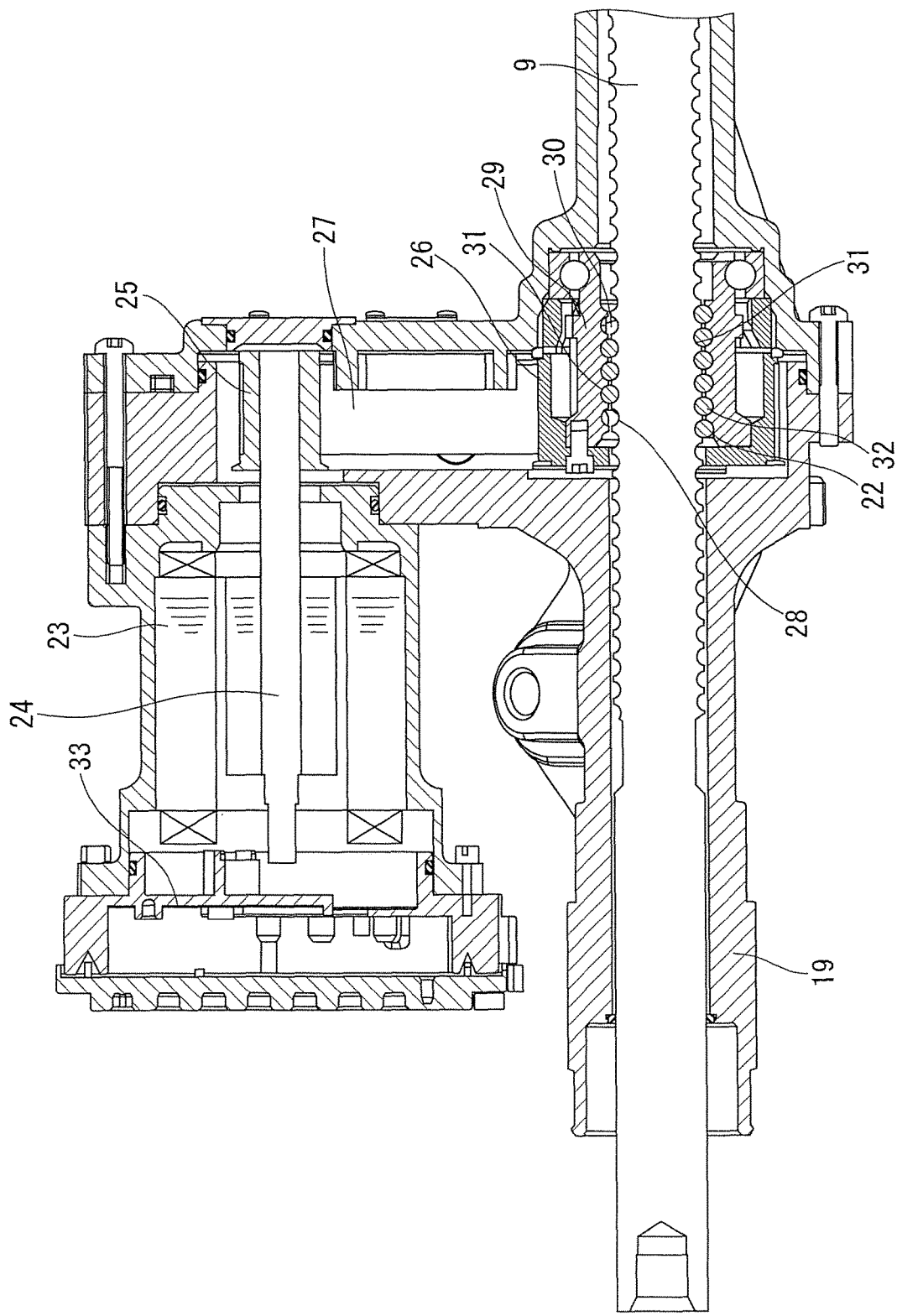
FIG. 3 is a cross-sectional view of the power steering device as taken along a line B-B of FIG. 2.

As shown in FIGS. 1 to 3, a steering unit 4 is disposed to provide mechanical coupling between a steering wheel 2, which is arranged in a driving space of a vehicle, and steerable front wheels 3A and 3B of the vehicle. The steering unit 4 includes: a steering shaft 7 coupled to the steering wheel via an intermediate shaft 5 and a universal joint 6 so as to be integrally rotatable with the steering wheel; a pinion shaft 8 made of an iron-based metal material (such as steel) and coupled to the steering shaft 7 via a torsion bar; and a rack bar 9 made of an iron-based metal material (such as steel) and having a rack 9A formed on an outer circumferential surface thereof in engagement with a pinion 8A formed on an outer circumferential surface of the pinion shaft 8. Both end portions of the rack bar 9 are coupled to the steerable vehicle wheels 3A and 3B via ball joints 10 and 11, tie rods 12 and 13 and knuckle arms 14 and 15, respectively.

When the steering wheel 2 is turned by a driver, the intermediate shaft 5 and the steering shaft 7 rotate around their axes to cause torsion of the torsion bar. Under the action of the thus-generated elastic force of the torsion bar, the pinion shaft 8 rotates to follow the rotation of the steering shaft 7. The rotation of the pinion shaft 8 is converted to axial linear movement of the rack bar 9 by a rack-pinion mechanism, which is constituted by the rack 9A and the pinion 4A. With the linear movement of the rack bar, the knuckle arms 14 and 15 are pulled in a width direction of the vehicle through the ball joints 10 and 11 and the tie rods 12 and 13 so as to thereby change the direction of the steerable vehicle wheels 3A and 3B.

In a sensor housing 16 in which the steering shaft 7 and the pinion shaft 8 are inserted, there are arranged, as sensors for detecting various information, a steering angle sensor (see FIG. 4) that detects a steering angle of the steering shaft 7 and a torque sensor 18 (see FIG. 4) that detects a steering torque inputted to the steering shaft 7 based on a relative rotation angle difference between the steering shaft 7 and the pinion shaft 8 caused by torsion of the torsion bar.

Accordion boots 20 and 21 are disposed on both axial end portions of a gear housing 19 in which the rack bar 9 is placed, so as to respectively surround outer circumferences of one end portions of the tie rods 12 and 13. Each of these accordion boots 20 and 21 is made of e.g. a synthetic rubber material to ensure given flexibility and to prevent the entry of water, dust etc. into the rack bar 9 and the after-mentioned ball-screw mechanism 22.

An electric motor 23 is arranged to apply a steering force to the steering unit 4. As specifically shown in FIG. 3, the electric motor 23 is linked to the rack bar 9 by having an input pulley 25 fixed around a tip end portion of an output shaft 24 of the electric motor and an output pulley 26 fixed around the rack bar 9 and connected to the input pulley 25 via a belt 27. Namely, the input and output pulleys 25 and 26 and the belt 27 constitute a transmission mechanism. The ball-screw mechanism 22 with helical grooves is provided, as a reduction gear, between the output pulley 26 and the rack bar 9.

More specifically, the ball-screw mechanism 22 includes: a rack bar-side helical ball screw groove 28 recessed in an outer circumferential surface of the rack bar 9; an annular nut 29 made of an iron-based metal material and disposed around the rack bar 9 so as to be freely rotatable relative to rack bar 9; a nut-side helical ball screw groove 31 recessed in an inner circumferential surface of the nut 29 to define a ball circulation channel 30 with the rack bar-side ball screw groove 28; a plurality of balls 32 made of an iron-based metal material and arranged in the ball circulation channel 30; and a tube member (as a circulation member) made of an iron-based metal material and disposed radially outside the nut 29 so as to connect one end to the other end of the ball circulation channel 30 and allow circulation of the balls 32 from the one end to the other end of the ball circulation channel 30. By this ball-screw mechanism, rotation of the electric motor 23 transmitted from the belt 27 is converted to linear movement of the rack bar 9 while being reduced.

As a control unit, an electrical control unit (ECU) 33 is provided integral with the electric motor 23, and has the function of storing and executing various control processing to perform drive control of the electric motor 23 for applying a steering assist torque to the steering unit 4 based on vehicle information such as steering angle, steering torque, vehicle running speed etc. The configuration of the control unit 33 will be explained in detail below with reference to FIG. 4.

Figure 4:
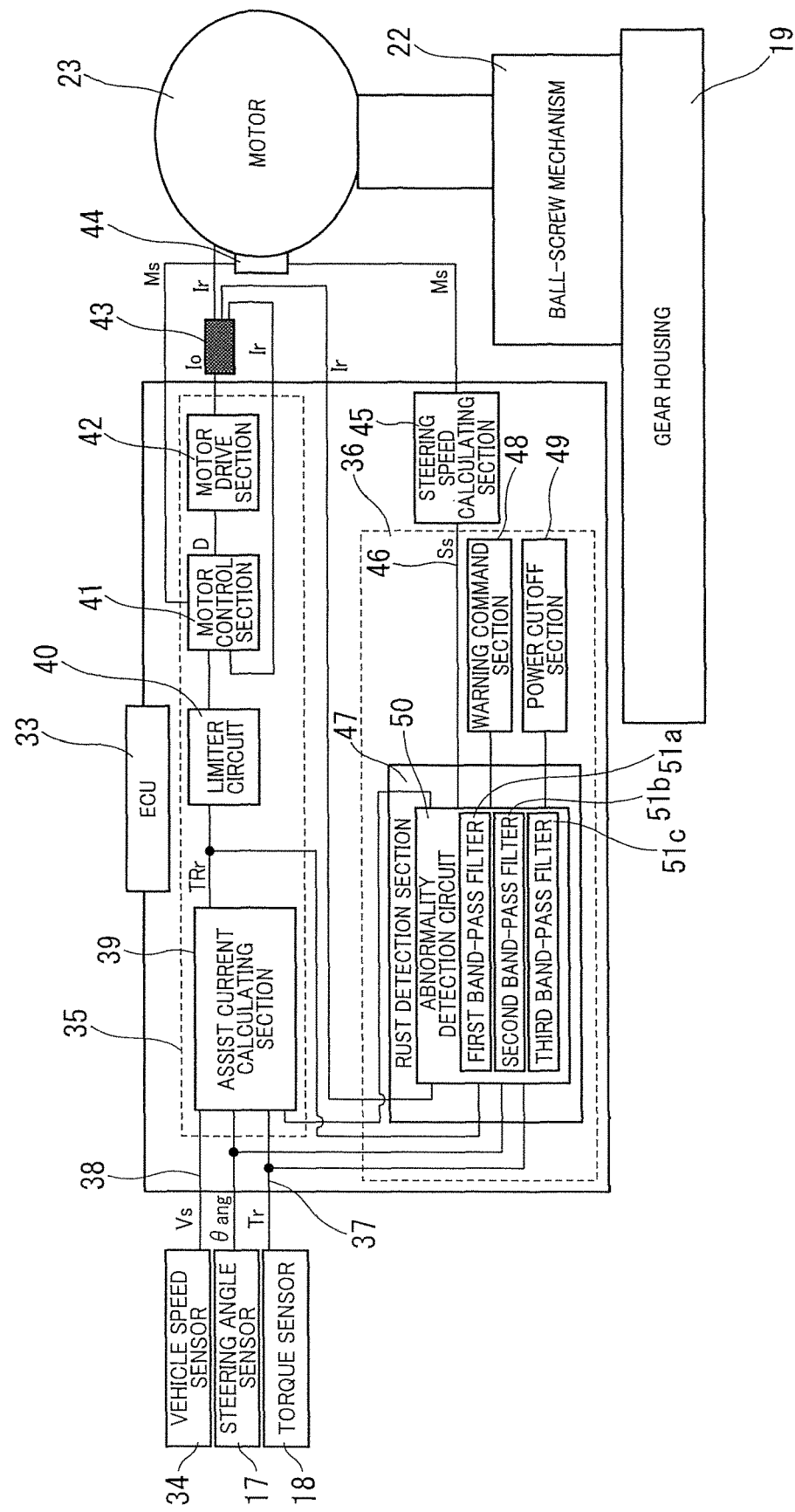
FIG. 4 is a control block diagram of a control unit shown in FIG. 1.

FIG. 4 is a block diagram showing the detailed control configuration of the control unit 33.

The control unit 33 includes: an assist current command part 35 that determines a drive current Io for driving the electric motor 23 based on a steering torque signal Tr (hereinafter referred to as "steering torque Tr") indicative of the steering torque detected by the torque sensor 18, a vehicle speed signal Vs (hereinafter referred to as "vehicle speed Vs") indicative of the vehicle running speed detected by a vehicle speed sensor 34, which is disposed on e.g. a differential gear, and the like, and outputs the drive current Io to the electric motor 23; and an abnormality detection command part 36 that detects an abnormality in the power steering device 1 based on the steering torque Tr and the like, and controls the operations of the assist current command part 35 according to the abnormality detection result. The torque sensor 18 is connected to a steering torque signal receiving section 37 of the control unit 33 so that the steering torque signal receiving section 37 receives the steering torque Tr from the torque sensor 18. The vehicle speed sensor 34 is connected to a vehicle speed signal receiving section 38 of the control unit 33 so that the vehicle speed signal receiving section 38 receives the vehicle speed Vs from the vehicle speed sensor 34.

The assist current command part 35 has: an assist current calculating section 39 that calculates a motor command current signal TRr for drive control of the electric motor 23 (hereinafter referred to as "motor command current TRr") based on the vehicle speed Vs, a steering angle signal θang (hereinafter referred to as "steering angle θang") indicative of the steering angle detected by the steering angle sensor 17, and the steering torque Tr; a limiter circuit 40 that limits the motor command current TRr to be larger than or equal to a predetermined upper limit value; a motor control section 41 that generates a motor drive signal D for the electric motor 23 based on the motor command current TRr; and a motor drive section 42 that applies the motor drive current Io to the electric motor 23 according to the motor drive signal D. A motor current detection section 43 is provided between the motor drive section 42 and the electric motor 23 so as to give feedback of the current actually flowing in the electric motor 23 as an actual motor current Ir to the motor control section 41.

Further, a motor rotation speed sensor 44 is disposed on the electric motor 23 to detect a rotation speed signal Ms of the motor output shaft 24 (hereinafter referred to as "motor rotation speed Ms"). The motor rotation speed sensor 44 is connected to both of the motor control section 41 and a steering speed calculating section 45 of the control unit 33. The motor control section 41 adjusts the motor drive signal D according to the motor rotation speed M detected by the motor rotation speed sensor 44 and thereby controls the amount of the actual motor current Ir flowing in the electric motor 23. The steering speed calculating section 45 calculates the rotation speed of the steering wheel 2 as a steering speed Ss based on the motor rotation speed Ms. The steering speed calculating section 45 is connected to a steering speed signal receiving section 46 of the control unit 33 so that the steering speed signal receiving section 46 receives the steering speed Ss from the steering speed calculating section 45.

The abnormality detection command part 36 has: a rust detection section 47; a warning command section 48 that causes a warming lamp (not shown) to indicate a warning according to the processing result of the rust detection section 47; and a power cutoff section 49 that cuts off the current supply to the electric motor 23 according to the processing result of the rust detection section 47. Namely, the abnormality detection command part 36 is adapted to detect the device abnormality due to the occurrence of rust on the rack bar 9 and the ball-screw mechanism 22 and alert the driver of the device abnormality.

The rust detection section 47 includes an abnormality detection circuit 50 configured to judge the occurrence of the abnormality in the power steering device 1 based on the steering speed Ss and on the steering torque Tr as steering force information. The motor command current TRr or the actual motor current Ir can be used as the steering force information in view of the facts that the motor command current TRr is increased with increase in the steering torque Tr; and the actual motor current Ir is increased with increase in the motor command current TRr. When the motor command current TRr is limited by the limiter circuit 40, the steering torque Tr is increased. In this case, the rust detection section 47 does not use the steering force information for judgment of the device abnormality.

The abnormality detection circuit 50 is provided in a microcomputer of the control unit 33 and loaded with a program. In the microcomputer, the steering force information is processed as digital data. The abnormality detection circuit 50 has first to third band-pass filters (as filter circuit elements) 51a, 51b and 51c to extract frequency components of the steering force information periodically changing in the frequency ranges of 8 to 12 Hz, 20 to 25 Hz and 40 to 50 Hz. The upper limit value of the 20-25 Hz frequency range, that is, 25 Hz is set lower than the resolution of the digital data of the steering force information or the resolution of the microprocessor.

Herein, the above-mentioned frequency values of 20 Hz and 25 Hz respectively correspond to the claimed first and second frequencies.

FIG. 5(a) is a graph showing a time plot of the peak level Trpl of the frequency component of the steering torque Tr associated with torque variations of the torsion bar, at the time of steering at a steering speed of 30 deg/sec, in the case of the power steering device 1 having the rack bar 9 and the ball-screw mechanism 22 in new condition and being placed on a laboratory bench. The peak level Trpl is a value determined by band-pass filtering the steering torque Tr in the frequency range of 20 to 25 Hz to extract the frequency component of the steering torque Tr associated with the torque variations, and then, averaging peak values Trp of the extracted frequency component. The peak level Trpl periodically changes. The higher the peak level Trpl, the more the 20-25 Hz frequency component contained in the steering torque signal.

FIG. 5(b) is a graph showing a time plot of the peak level Trpl of the frequency component of the steering torque Tr associated with torque variations of the torsion bar, at the time of steering at a steering speed of 30 deg/sec, in the case of the power steering device 1 having the rack bar 9 and the ball-screw mechanism 22 rusted by immersion in salt water for 9 days and being placed on a laboratory bench. The peak level Trpl is a value determined in the same manner as above by band-pass filtering the steering torque Tr in the frequency range of 20 to 25 Hz to extract the frequency component of the steering torque Tr associated with the torque variations, and then, averaging peak values Trp of the extracted frequency component.

As is seen from comparison of FIG. 5(a) and FIG. 5(b), the peak level Trpl of the frequency component in the frequency range of 20 to 25 Hz periodically changes and becomes higher in the state where the rack bar 9 and the ball-screw mechanism of the power steering device 1 are rusted than in the state where the rack bar 9 and the ball-screw mechanism 22 of the power steering device 1 are new. It can be said from these results that, in the frequency range of 20 to 25 Hz, the torque variations of the torsion bar become large due to the occurrence of rust on the rack bar 9 and the ball-screw mechanism 22.

In the same experiments as those of FIG. 5(a) and FIG. 5(b) conducted in the other frequency ranges of 8 to 12 Hz and 40 to 50 Hz, there is almost no difference in the peak level of the frequency component between the state where the rack bar 9 and the ball-screw mechanism 22 of the power steering device 1 are new and the state where the rack bar 9 and the ball-screw mechanism of the power steering device 1 are rusted.

Figure 6:
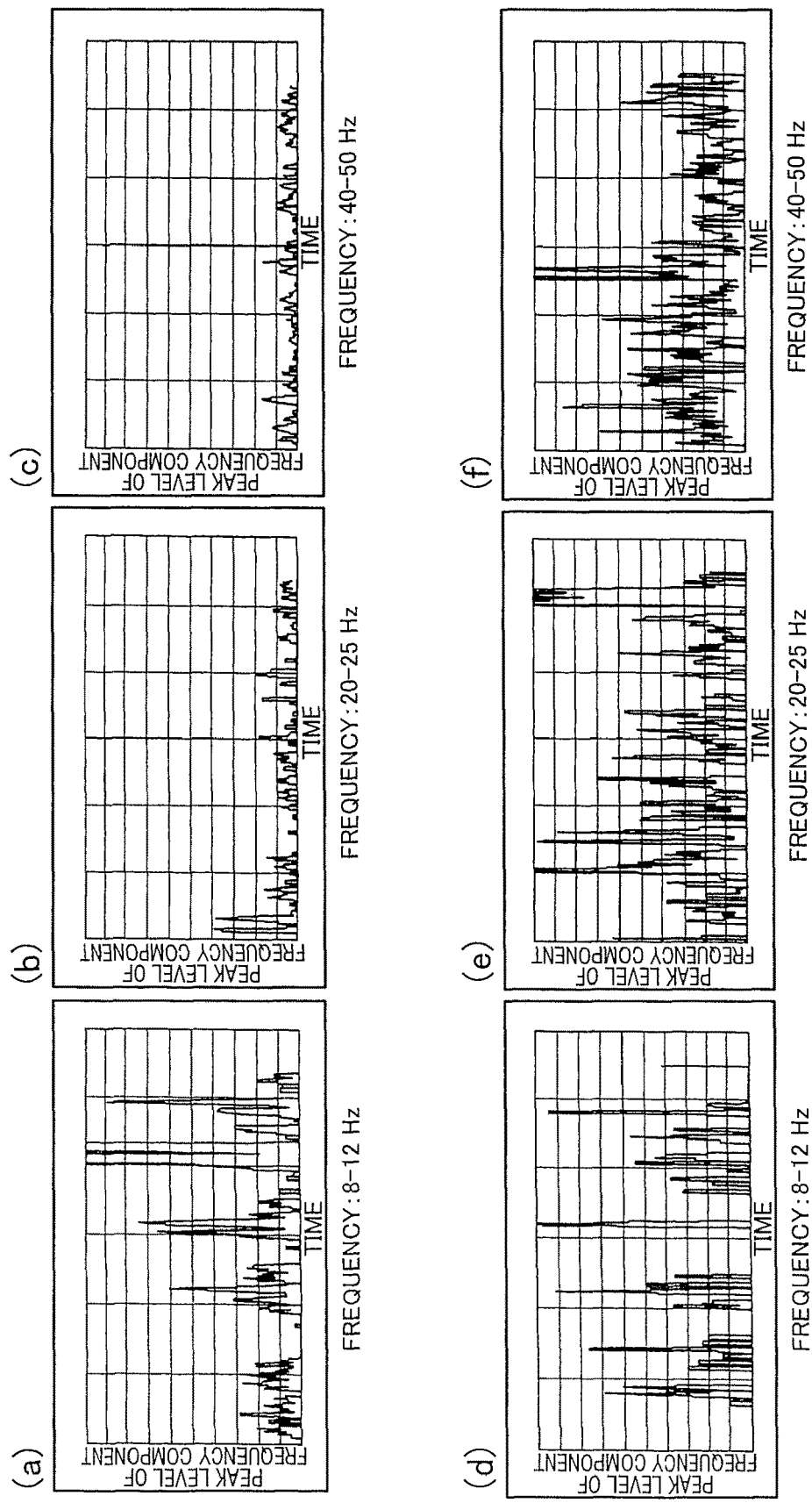
FIGS. 6(a) to 6(c) are graphs of data showing experimental results of the power steering device when tested on a paved road.
FIGS. 6(d) to 6(f) are graphs of data showing experimental results of the power steering device when tested on a gravel road.

FIGS. 6(a) to 6(c) are graphs respectively showing time plots of the peak levels Trpl of the frequency components of the steering torque Tr associated with torque variations of the torsion bar at the time of steering at a predetermined steering speed, during running of the vehicle on a paved road, in the case of the power steering device 1 having the rack bar 9 and the ball-screw mechanism 22 in new condition and being mounted on the vehicle. The peak levels Trpl of FIGS. 6(a) to 6(c) are values respectively determined by band-pass filtering the steering torque Tr in the frequency ranges of 18-12 Hz, 20-25 Hz and 40-50 Hz to extract the frequency components of the steering torque Tr associated with the torque variations, and then, averaging peak values Trp of the extracted frequency components.

FIGS. 6(d) to 6(f) are graphs respectively showing time plots of the peak levels Trpl of the frequency components of the steering torque Tr associated with torque variations of the torsion bar at the time of steering at a predetermined steering speed, during miming of the vehicle on a gravel road, in the case of the power steering device 1 having the rack bar 9 and the ball-screw mechanism 22 in new condition and being mounted on the vehicle. The peak levels Trpl of FIGS. 6(d) to 6(f) are values respectively determined in the same manner as above by band-pass filtering of the steering torque Tr in the frequency ranges of 18-12 Hz, 20-25 Hz and 40-50 Hz to extract the frequency components of the steering torque Tr associated with the torque variations, and then, averaging peak values Trp of the extracted frequency components.

As is seen from comparison of FIG. 6(a) and FIG. 6(d), the periodically changing peak level Trpl of the frequency component in the frequency range of 18 to 12 Hz becomes higher on the gravel road than on the paved road.

Similarly, the periodically changing peak level Trpl of the frequency component in the frequency range of 20 to 25 Hz becomes higher on the gravel road than on the paved road as is seen from comparison of FIG. 6(b) and FIG. 6(e).

As is seen from comparison of FIG. 6(c) and FIG. 6(f), the periodically changing peak level Trpl of the frequency component in the frequency range of 40 to 50 Hz similarly becomes higher on the gravel road than on the paved road.

As explained above, the peak level Trpl of the frequency component in each of the frequency ranges of 8 to 12 Hz, 20 to 25 Hz and 40 to 50 Hz becomes higher under the influence of vehicle vibration caused by uneven spots on the gravel road. On the other hand, only the peak level Trpl of the frequency component in the frequency range of 20 to 25 Hz also becomes higher under the influence of vehicle vibration caused due to rust on the rack bar 9 and the ball-screw mechanism 22. In the present embodiment, the device abnormality due to rust on the rack bar 9 or the ball-screw mechanism 22 is accordingly detected on the basis of changes in the peak level Trpl of the 20-25 Hz frequency component of the steering torque during running of the vehicle on a flat road, assuming the road condition as follows: roads on which vehicle vibration caused by uneven road spots is less than a predetermined level, such as paved roads, are flat roads; and roads on which vehicle vibration caused by even road spots is more than or equal to the predetermined level, such as gravel roads, are rough roads.

The criteria for judgment of flat and rough roads in the present embodiment will be now explained below.

When all the periodically changing peak levels Trpl of the frequency components in the three frequency ranges of 8 to 12 Hz, 20 to 25 Hz and 40 to 50 Hz are lower than 0.5 Nm during straight running of the vehicle, the road on which the vehicle is running is judged as a flat road. The conditions of straight running of the vehicle are as follows: the vehicle speed Vs is higher than 15 km/h; the steering torque Tr is smaller than 1 Nm; the steering angle θang is smaller than 30 degrees; and the steering speed Ss is lower than 5 deg/sec. The flat road counter value Cntg is set to "1" in the after-mentioned control process of the rust detection section in the case where all the peak levels Trpl of the frequency components in the above three frequency ranges remains lower than 0.5 Nm for 2 seconds.

When at least one of the peak levels Trpl of the frequency components in the three frequency ranges of 8 to 12 Hz, 20 to 25 Hz and 40 to 50 Hz is higher than or equal to 0.5 Nm during straight running of the vehicle, the road on which the vehicle is running is judged as a rough road. In this case, the flat road counter value Cntg is set to "0" in the control process of the rust detection section. For example, bumpy roads with highway joint seams can be detected by rough road judgment in the frequency range of 8 to 12 Hz because the frequency component of the steering torque Tr varies on the order of 10 Hz (i.e. the order of the resonant frequency of the torsion bar) on such bumpy roads.

Next, the criteria for judgment of the device abnormality due to rust on the rack bar 9 and the ball-screw mechanism 22 will be explained below.

When both of the peak levels Trpl of the steering torque frequency components in the two frequency ranges of 8 to 12 Hz and 40 to 50 Hz are lower than 0.5 Nm, and the peak level Trpl of the steering torque frequency component in the frequency range of 20 to 25 Hz is higher than 0.8 Nm, at the time of steering at a steering speed of 30 to 90 deg/sec during running of the vehicle on a flat road, it is judged that rust has occurred on the rack bar 9 and the ball-screw mechanism 22. In the case where such a state continues for 0.5 seconds, the rust detection counter value Cntr is incremented. Herein, the above steering speed values of 30 deg/sec and 90 deg/sec respectively correspond to the claimed first and second steering speeds.

It is determined that rust has not occurred on the rack bar 9 and the ball-screw mechanism 22 when all the peak levels Trpl of the frequency components in the three frequency ranges of 8 to 12 Hz, 20 to 25 Hz and 40 to 45 Hz are lower than 0.5 Nm at the time of steering at a steering speed of 30 to 90 deg/sec during running of the vehicle on a flat road. In this case, the rust detection counter value Cntr is decremented.

When at least one of the peak levels Trpl of the frequency components in the two frequency ranges of 8 to 12 Hz and 40 to 50 Hz is higher than or equal to 0.5 Nm at the time of steering at a steering speed of 30 to 90 deg/sec during running of the vehicle on a flat road, the rust detection counter value Cntr is maintained at its previous value upon judgment that the vehicle is running on a rough road rather than the flat road.

The above abnormality detection is executed when the vehicle speed Vs is higher than 15 km/h and, at the same time, the torque direction of the torsion bar is in agreement with the direction of the steering speed. The lower limit value of the 8-12 Hz frequency range, that is, 8 Hz is set higher than a frequency level at which driver's intentional steering is possible.

Figure 7:
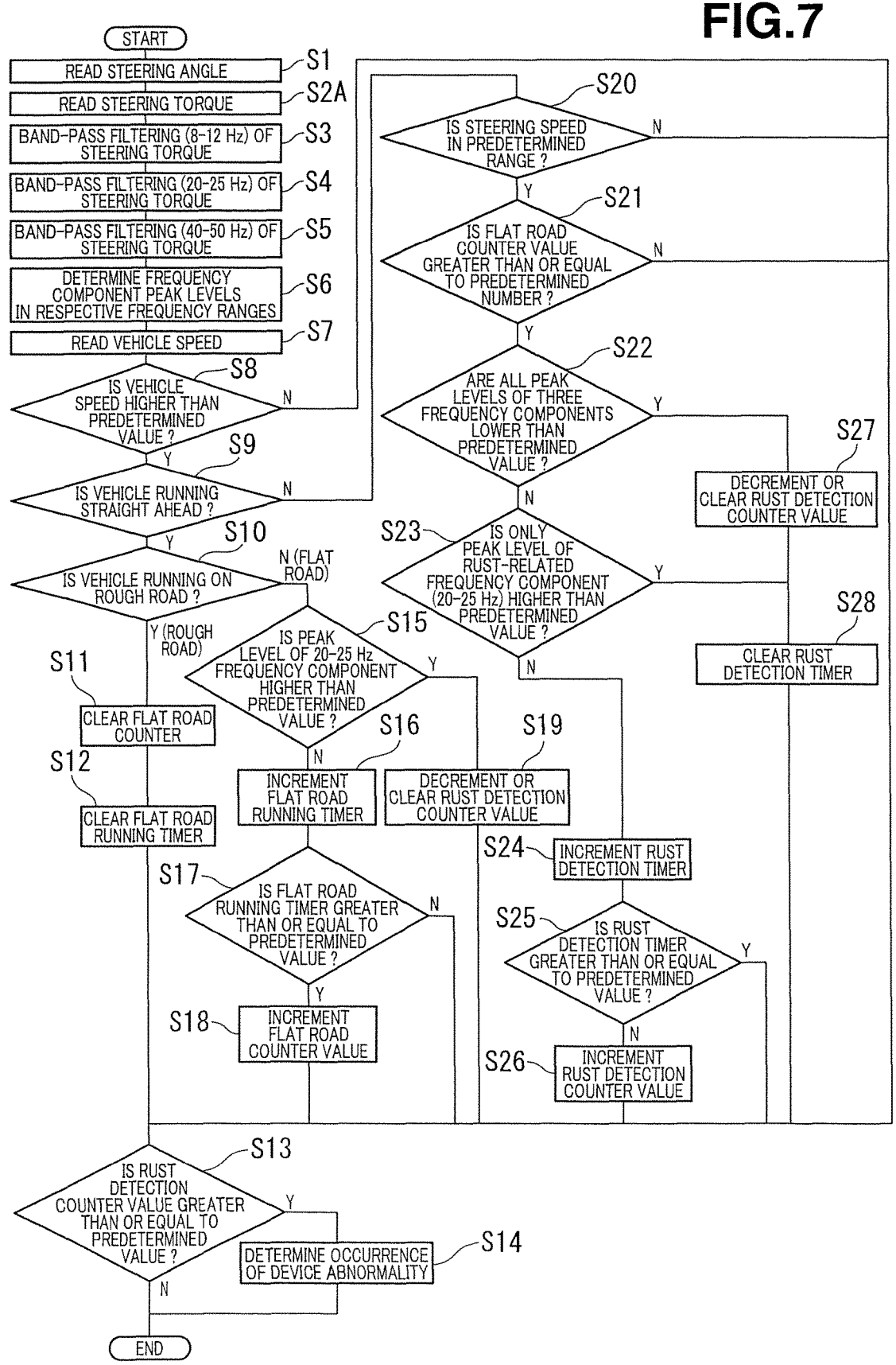
FIG. 7 is a flowchart of a control process of a rust detection section shown in FIG. 4 according to a first embodiment of the present invention.

Next, the control process of the rust detection section 47 according to the first embodiment of the present invention will be explained below with reference to FIG. 7.

The steering angle θang is first read from the steering angle sensor 17 (step 1). The steering torque Tr is then read from the torque sensor 18 (step 2A). The frequency components of the steering torque Tr associated with torque variations of the torsion bar are extracted by band-pass filtering the steering torque Tr in the frequency range of 8 to 12 Hz (step 3), in the frequency range of 20 to 25 Hz (step 4) and in the frequency range of 40 to 50 Hz (step 5). The peak levels Trpl of the frequency components in the respective frequency ranges are determined (step 6). The vehicle speed Vs is read from the vehicle speed sensor 34 (step 7). It is judged whether the vehicle speed Vs is higher than a predetermined value of 15 km/h (step 8). When the vehicle speed Vs is judged as being lower than or equal to 15 km/h, it is further judged whether the rust detection counter value Cntr is greater than or equal to a predetermined value of e.g. "5" (step 13). When the rust detection counter value Cntr is greater than or equal to "5", it is determined that there is a device abnormality occurring due to rust on the rack bar 9 and the ball-screw mechanism 22 (step 14). Then, a warning is given to inform the driver of the device abnormality. When the rust detection counter value Cntr is smaller than "5", the process exists upon judgment that no device abnormality is occurring.

When the vehicle speed Vs is judged as being higher 15 km/h in step 8, it is judged whether the vehicle is running straight ahead (step 9). When the vehicle is judged as running straight ahead, it is further judged whether the vehicle is running on a rough road (step 10). When the vehicle is judged as running on a rough road, the flat road counter value Cntg is cleared (step 11); and the flat road running timer Tntg is cleared (step 12). After that, the process proceeds to step 13.

When the vehicle is judged as running on a flat road in step 10, it is judged whether the peak level Trpl of the frequency component in the frequency range of 20 to 25 Hz is higher than a predetermined value of 0.8 Nm (step 15). When the peak level Trpl of the 20-25 Hz frequency component is judged as being higher than 0.8 Nm, the rust detection counter value Cntr is decremented or cleared (step 19) upon judgment that increase of the peak level Trpl is due to any cause other than rust. After that, the process proceeds to step 13. When the peak level Trpl of the 20-25 Hz frequency component is judged as being lower than or equal to 0.8 Nm in step 15, the flat road running counter Tntg is incremented (step 16). Then, it is judged whether the flat road running timer Tntg is greater than or equal to a predetermined value (step 17). When the flat road running timer Tntg is greater than or equal to the predetermined value, the flat road counter value Cntg is incremented (step 18). After that, the process proceeds to step 13. When the flat road drive timer count Tntg is smaller than the predetermined value, the process directly proceeds to step 13.

When the vehicle is judged as not running straight ahead (i.e. judged as being steered) in step 9, it is judged whether the steering speed Ss is in a predetermined range of 30 to 90 deg/sec (step 20). When the steering speed Ss is not in the range of 30 to 90 deg/sec, the process proceeds to step 13. When the steering speed Ss is in the range of 30 to 90 deg/sec, it is judged whether the flat road counter value Cntg is greater than or equal to a predetermined value of "1" (step 21). When the flat road counter value Cntg is smaller than "1", the process proceeds to step 13. When the flat road counter value Cntg is greater than or equal to "1", it is judged whether all the peak levels Trpl of the frequency components in the three frequency ranges of 8 to 12 Hz, 20 to 25 Hz and 40 to 50 Hz are lower than a predetermined value of 0.5 Nm. When all the peak levels Trpl of the frequency components in the three frequency ranges are judged as being lower than 0.5 Nm, the rust detection counter value Cntr is decremented or cleared (step 27); and the rust detection timer Tntr is cleared (step 28). After that, the process proceeds to step 13.

When the condition that all of the three peak levels Trpl are lower than 0.5 Nm is not met in step 22, it is judged whether the peak level Trpl of the frequency component in the frequency range of 20 to 25 Hz is higher than a predetermined value of 0.8 Nm (step 23). When only the peak level Trpl of the 20-25 Hz frequency component is lower than or equal to 0.8 Nm, the rust detection timer Tnt is cleared (step 28). After that, the process proceeds to step 13. When the peak level Trpl of the 20-25 Hz frequency component is higher than 0.8 Nm, the rust detection timer Tntr is incremented (step 24). Subsequently, it is judged whether the rust detection timer Tntr is greater than or equal to a predetermined value of e.g. "5" (step 25). When the rust detection timer Tntr is greater than or equal to "5", the process proceeds to step 13. When the rust detection timer Tntr is smaller than "5", the rust detection counter value Cntr is incremented (step 26). After that, the process proceeds to step 13.

In the above embodiment, the device abnormality due to rust on the rack bar 9 and the ball-screw mechanism 22 is detected under the condition that the vehicle speed is higher than 15 km/h. It is however preferable that the peak level Trpl of the frequency component in the range of 20 to 25 Hz is not used for judgment of the device abnormality when the vehicle speed is higher than or equal to a predetermined relatively high vehicle speed such as when the vehicle is running on a highway at 80 km/h or higher. At the predetermined vehicle speed or higher e.g. during highway running, there is a high likelihood that steering operation is hardly performed. It is possible to improve the accuracy of detection of the device abnormality by avoiding using the peak level Trpl under such a high vehicle speed condition.

Herein, the above predetermined relatively high vehicle speed corresponds to the claimed predetermined vehicle speed.

As described above, the power steering device 1 performs abnormality detection by judging the state in which the value of the steering force information in the predetermined frequency range is higher than the predetermined value as the device abnormality. The device abnormality can be thus accurately detected on the basis of changes in the steering force information value, without the use of an additional structural component part such as water drop sensor.

In other words, the device abnormality is judged as occurring when the value of the steering force information in the predetermined frequency range becomes higher than the predetermined value due to the occurrence of rust in the steering unit. It is therefore possible to achieve accurate detection of the device abnormality.

In the above embodiment, the peak level Trpl, that is, the average of the peak values Trp of the frequency component in the predetermined frequency range is used for judgment of the device abnormality due to rust. It is thus possible to suppress misjudgment caused by increase of the frequency component under the influence of noise etc.

Further, the peak level of the frequency component at frequencies lower than 20 Hz is not used for judgment of the road condition in the above embodiment. By avoiding using such a steering force information value, it is possible to suppress misjudgment caused at frequencies lower than 20 Hz during running on an uneven road area for driver's caution, and thereby possible improve the accuracy of detection of the device abnormality.

It is also possible to suppress misjudgment caused at a steering speed of driver's periodic steering operation as the frequency range lower than 20 Hz is set higher than the frequency level at which driver's intentional steering is possible.

Furthermore, the peak level of the frequency component at frequencies higher than 25 Hz is not used for judgment of the device abnormality due to rust in the above embodiment. By avoiding using such a steering force information value, it is possible to detect the occurrence of rust in the narrower frequency range and improve the accuracy of detection of the device abnormality.

In the above embodiment, the value of the steering force information at a steering speed Ss of lower than 30 deg/sec is not also used for judgment of the device abnormality. When the steering speed Ss is relatively low e.g. during straight running of the vehicle or during holding of the steering wheel 2, it is less likely that there will occur periodic changes in the value of the steering force information due to the device abnormality. By avoiding using such a steering force information value for judgment of the device abnormality, it is possible to suppress misjudgment caused by any factor other than rust, such as vehicle vibration on uneven road spots, and thereby possible to improve the accuracy of detection of the device abnormality.

The value of the steering force information during straight running of the vehicle is not also used for judgment of the device abnormality in the above embodiment. When the vehicle is running straight ahead but on a road with drain ditches, the value of the steering force information may be changed by the road surface in the predetermined frequency range. By avoiding using such a steering force information value for judgment of the device abnormality, it is possible to suppress misjudgment caused on the road with drain ditches.

Since the steering speed Ss is calculated based on the rotation speed of the electric motor 23 in the above embodiment, it is possible to obtain the steering speed Ss without the use of an additional sensor etc.

In the above embodiment, the value of the steering force information at a steering speed Ss of higher than 90 deg/sec is not also used for judgment of the device abnormality. When the steering speed Ss is relatively high e.g. during quick steering, there is a tendency that the value of the steering force information will increase irrespective of the occurrence or non-occurrence of the device abnormality. By avoiding using such a steering force information value for judgment of the device abnormality, it is possible to improve the accuracy of detection of the device abnormality.

Moreover, the upper limit value of the 20-25 Hz frequency range, that is, 25 Hz is set lower than the resolution of the digital data of the steering force information or the resolution of the microprocessor in the above embodiment. When the upper limit value is set higher than the resolution of the digital data of the steering force information or the resolution of the microprocessor, the microcomputer cannot properly judge the upper limit value. By setting the upper limit value as above, it is possible to adequately judge the device abnormality within the range of performance of the microcomputer.

In the above embodiment, the occurrence of the device abnormality is determined when the value of the abnormality detection counter is incremented to the predetermined value, rather than immediately when the value of the steering force information in the predetermined frequency range becomes higher than the predetermined value. It is thus possible to suppress misjudgment caused by noise etc.

Further, the value of the abnormality detection counter is decremented when the value of the steering force information returns to a value irrelevant to the occurrence of rust. It is thus possible to suppress accumulation of the counter value due to noise.

When the motor command current TRr for the electric motor 23 is limited by the limiter circuit 40, the steering torque Tr is increased. By avoiding using such a steering force information value, it is possible to improve the accuracy of detection of the device abnormality.

It is further possible in the above embodiment to easily and properly extract the value of the steering force information in the predetermined frequency range by the use of the filter circuit element.

Figure 8:
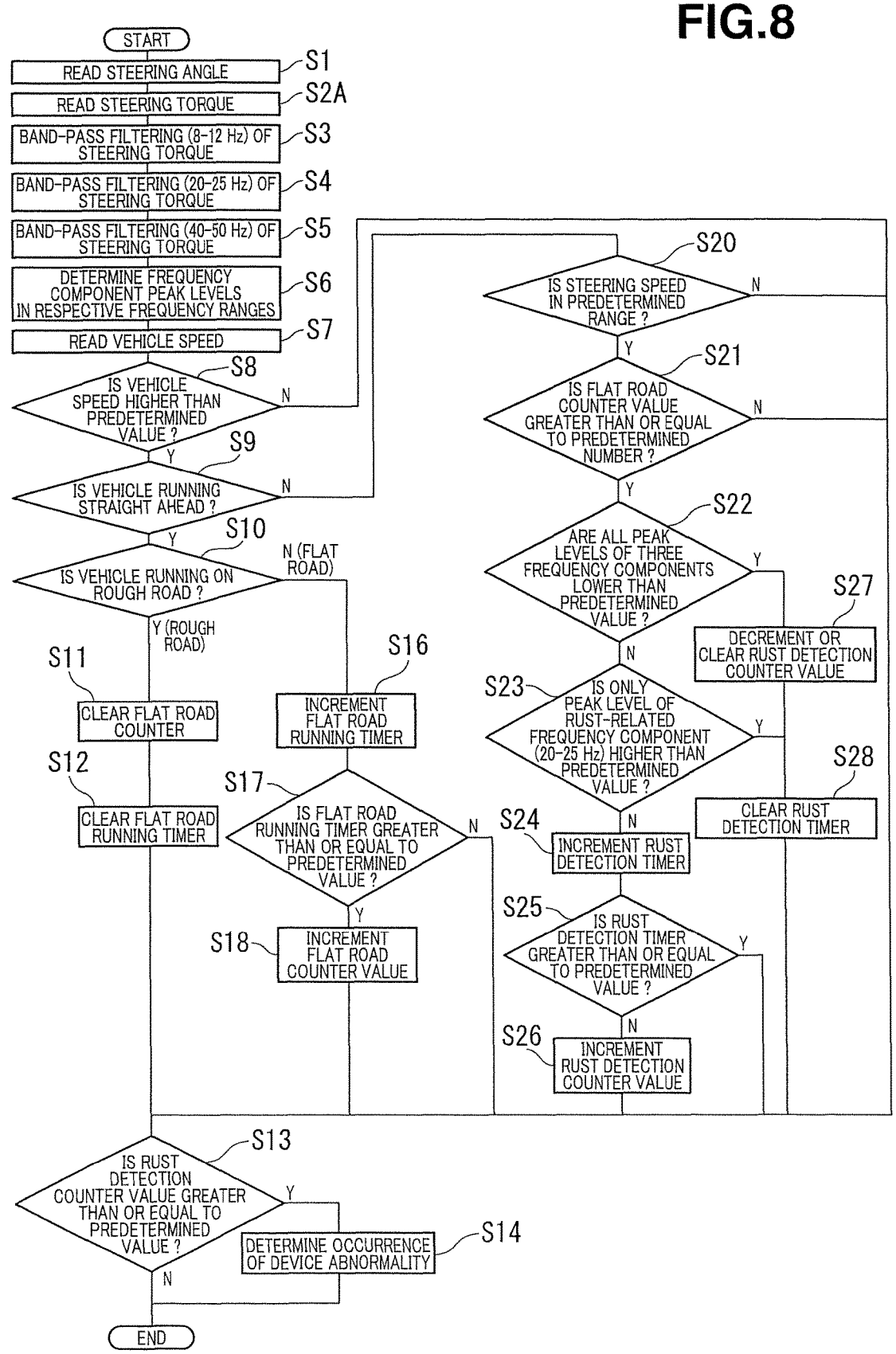
FIG. 8 is a flowchart of a control process of the rust detection section shown in FIG. 4 according to a second embodiment of the present invention.

FIG. 8 shows a control process of the rust detection section 47 according to the second embodiment of the present invention. The control process of the second embodiment is different from that of the first embodiment shown in FIG. 7, in that the processing of steps 15 and 19 are omitted.

Figure 9:
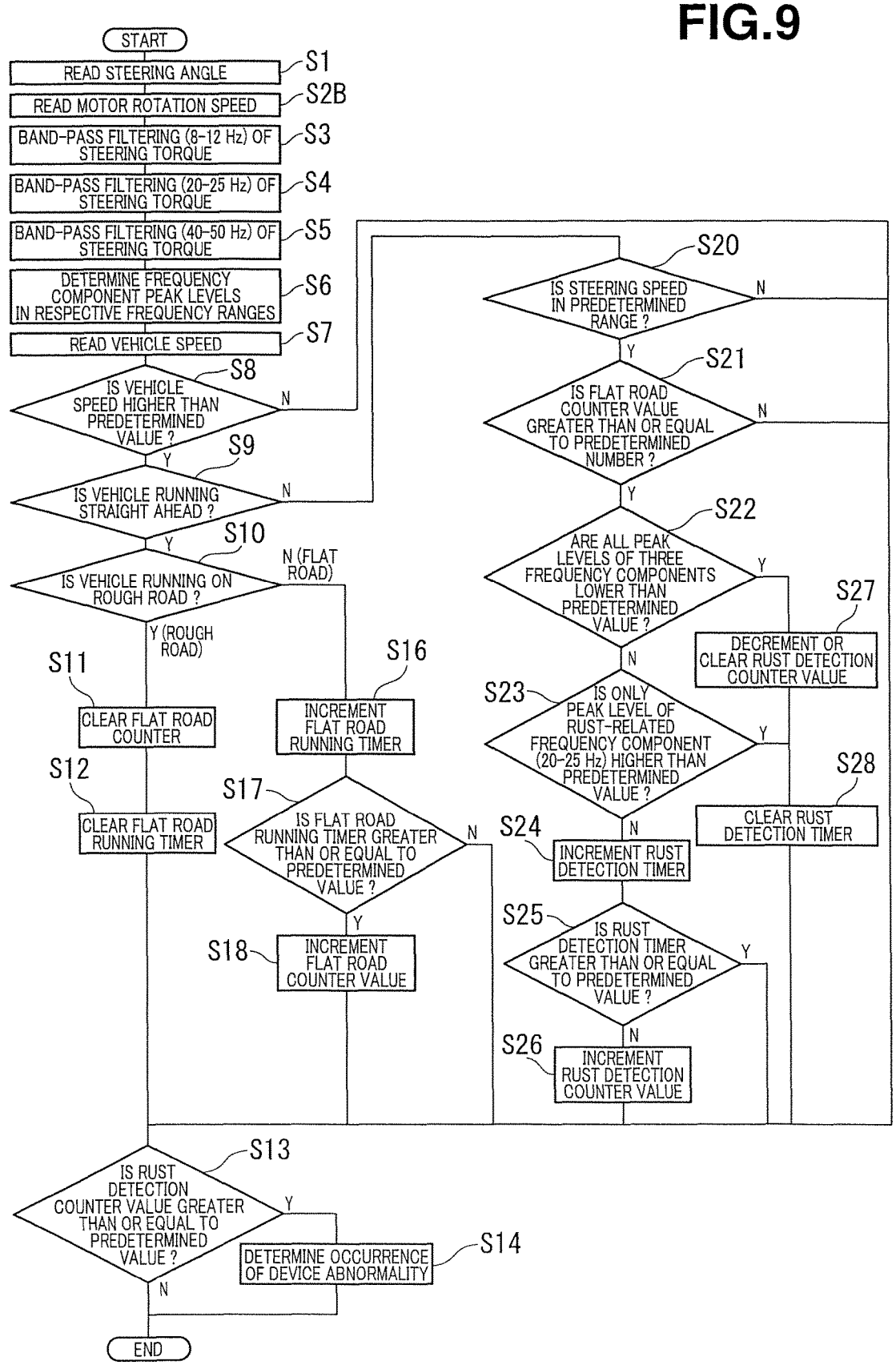
FIG. 9 is a flowchart of a control process of the rust detection section shown in FIG. 4 according to a third embodiment of the present invention.

FIG. 9 shows a control process of the rust detection section 47 according to the second embodiment of the present invention. The control process of the third embodiment is different from that of the first embodiment shown in FIG. 7, in that: the processing of steps 15 and 19 are omitted; and the reading of the steering torque in step 2A is replaced with the reading of the motor rotation speed in step 2B. As mentioned above, the actual motor current Ir can be used in place of the steering torque Tr as the steering force information for judgment of the abnormality in the power steering device 1. The actual motor current Ir is controlled according to the motor rotation speed M detected by the motor rotation speed sensor 44 as explained above with reference to FIG. 4. Thus, the controlled actual motor current Ir is obtained and used as the steering force information by reading the motor rotation speed Ms in step 2B in place of the steering torque Tr.

In each of the above control processes, it is feasible to determine the occurrence of the abnormality in the power steering device 1 when the abnormality is detected over a plurality of trips on the assumption that one trip is a period from turn-on to turn-off of an ignition switch of the vehicle. This allows judgment of the device abnormality based on more information and thereby contributes to improvement in abnormality detection accuracy.

Based on the above-described embodiments, the power steering device according to the present invention can be implemented by the following aspects or configurations.

In one aspect of the present invention, the power steering device comprises: a steering unit having: a steering shaft rotatable with rotation of a steering wheel of a vehicle; and a rack bar made of an iron-based metal material and axially movable in response to rotation of the steering shaft; an electric motor arranged to apply a steering force to the steering unit; a ball-screw mechanism arranged as a reduction unit between the steering unit and the electric motor so as to transmit a toque of the electric motor to the steering unit, the ball-screw mechanism including: a steerable wheel-side ball screw groove helically recessed in an outer circumferential surface of the rack bar; a nut made of an iron-based metal material in an annular shape and arranged to surround the rack bar and be rotatable relative to the rack bar; a nut-side ball screw groove helically recessed in an inner circumferential surface of the nut to define a ball circulation channel with the steerable wheel-side ball screw groove; a plurality of balls made of an iron-based metal material and arranged in the ball circulation channel; and a circulation member connecting one end to the other end of the ball circulation channel so as to allow circulation of the plurality of balls from the one end to the other end of the ball circulation channel; and a control unit arranged to drive and control the electric motor, the control unit including: a steering torque signal receiving section that receives a signal indicative of a steering torque generated in the steering unit; a command signal calculating section that calculates an electric motor command signal for drive control of the electric motor based on the steering torque signal; and an abnormality detection circuit configured to use the steering torque, the electric motor command signal or a motor current flowing in the electric motor as steering force information and judge the occurrence of an abnormality in the power steering device when a value of the steering force information periodically changes in a predetermined frequency range, which is higher than or equal to a first frequency and lower than or equal to a second frequency, and the value of the steering force information in the predetermined frequency range becomes higher than a predetermined value.

In a preferable aspect of the power steering device, the abnormality detection circuit is configured to judge the occurrence of the abnormality in the power steering device based on an average of peak values of the steering torque, the electric motor command signal or the motor current in the predetermined frequency range.

In another preferable aspect of the power steering device, the abnormality detection circuit is configured to, for judgment of the abnormality, not use the value of the steering force information at frequencies lower than the first frequency.

In still another preferable aspect of the power steering device, the control unit includes a steering speed signal receiving section that receives a signal indicative of a rotation speed of the steering wheel as a steering speed; and the first frequency is set higher than a frequency level at which driver's intentional steering is possible.

In still another preferable aspect of the power steering device, the abnormality detection circuit is configured to, for judgment of the abnormality, not use the value of the steering force information at frequencies higher than the second frequency.

In still another preferable aspect of the power steering device, the control unit includes a steering speed signal receiving section that receives a signal indicative of a steering speed; and the abnormality detection circuit is configured to, for judgment of the abnormality, not use the value of the steering force information under a condition that the steering speed is lower than a first steering speed.

In still another preferable aspect of the power steering device, the abnormality detection circuit is configured to, for judgment of the abnormality, not use the value of the steering force information during straight running of the vehicle.

In still another preferable aspect of the power steering device, the steering speed signal is calculated based on a rotation speed of the electric motor.

In still another preferable aspect of the power steering device, the control unit includes a steering speed signal receiving section that receive a signal indicative of a steering speed; and the abnormality detection circuit is configured to, for judgment of the abnormality, not use the value of the steering force information under a condition that the steering speed is higher than or equal to a second steering speed.

In still another preferable aspect of the power steering device, the abnormality detection circuit is equipped with an abnormality detection counter such that a value of the abnormality detection counter is incremented when the value of the steering force information in the predetermined frequency range becomes higher than the predetermined value; and the abnormality detection circuit is configured to determine the occurrence of the abnormality in the power steering device when the value of the abnormality detection counter reaches a predetermined counter value.

In still another preferable aspect of the power steering device, the value of the abnormality detection counter is decremented when the value of the steering force information in the predetermined frequency range becomes lower than the predetermined value.

In still another preferable aspect of the power steering device, the abnormality detection circuit is configured to determine the occurrence of the abnormality in the power steering device when the abnormality is detected over a plurality of trips, assuming that one trip is a period from turn-on to turn-off of an ignition switch of the vehicle.

In still another preferable aspect of the power steering device, the control unit is equipped with a limiter circuit to limit the electric motor command signal to be larger than or equal to a predetermined upper limit value; and the abnormality detection circuit is configured to, for judgment of the abnormality, not use the value of the steering force information under a condition that the electric motor command signal is being limited by the limiter circuit.

In still another preferable aspect of the power steering device, wherein the abnormality detection circuit has a filter circuit element that extracts the value of the steering force information in the predetermined frequency range.

In still another preferable aspect of the power steering device, the control unit includes a vehicle speed signal receiving section that receives a signal indicative of a running speed of the vehicle; and the abnormality detection circuit is configured to, for judgment of the abnormality, not use the value of the steering force information under a condition that the running speed of the vehicle is higher than or equal to a predetermined value.

In still another preferable aspect of the power steering device, the control device comprises a microcomputer in which the abnormality detection circuit is provided and loaded with a program; the steering force information is processed as digital data in the microcomputer; and the second frequency is set higher than a resolution of the digital data of the steering force information or a resolution of the microprocessor.

Based on the above-mentioned embodiments, the control device for the power steering device according to the present invention can be implemented by the following aspects or configurations.

The power steering device comprises: a steering unit having: a steering shaft rotatable with rotation of a steering wheel of a vehicle; and a rack bar made of an iron-based metal material and axially movable in response to rotation of the steering shaft; an electric motor arranged to apply a steering force to the steering unit; and a ball-screw mechanism arranged as a reduction unit between the steering unit and the electric motor so as to transmit a toque of the electric motor to the steering unit, the ball-screw mechanism including: a steerable wheel-side ball screw groove helically recessed in an outer circumferential surface of the rack bar; a nut made of an iron-based metal material in an annular shape and arranged to surround the rack bar and be rotatable relative to the rack bar; a nut-side ball screw groove helically recessed in an inner circumferential surface of the nut to define a ball circulation channel with the steerable wheel-side ball screw groove; a plurality of balls made of an iron-based metal material and arranged in the ball circulation channel; and a circulation member connecting one end to the other end of the ball circulation channel so as to allow circulation of the plurality of balls from the one end to the other end of the ball circulation channel.

The control device for the power steering device comprises: a steering torque signal receiving section that receives a signal indicative of a steering torque generated in the steering unit; a command signal calculating section that calculates an electric motor command signal for drive control of the electric motor based on the steering torque signal; and an abnormality detection circuit configured to use the steering torque, the electric motor command signal or a motor current flowing in the electric motor as steering force information and judge the occurrence of an abnormality in the power steering device when a value of the steering force information periodically changes in a predetermined frequency range, which is higher than or equal to a first frequency and lower than or equal to a second frequency, and the value of the steering force information in the predetermined frequency range becomes higher than a predetermined value.

In a preferable aspect of the control device for the power steering device, the abnormality detection circuit is configured to, for judgment of the abnormality, not use the value of the steering force information at frequencies higher than the second frequency.

The invention claimed is:

1. A power steering device, comprising:
   a steering unit having a steering shaft rotatable with rotation of a steering wheel of a vehicle; and a rack bar made of an iron-based metal material and axially movable in response to rotation of the steering shaft;
   an electric motor arranged to apply a steering force to the steering unit;
   a ball-screw mechanism arranged as a reduction unit between the steering unit and the electric motor so as to transmit a torque of the electric motor to the steering unit, the ball-screw mechanism including:
      a steerable wheel-side ball screw groove helically recessed in an outer circumferential surface of the rack bar;
      a nut made of an iron-based metal material in an annular shape and arranged to surround the rack bar and be rotatable relative to the rack bar;
      a nut-side ball screw groove helically recessed in an inner circumferential surface of the nut to define a ball circulation channel with the steerable wheel-side ball screw groove;
      a plurality of balls made of an iron-based metal material and arranged in the ball circulation channel; and
      a circulation member connecting one end to another end of the ball circulation channel so as to allow circulation of the plurality of balls from the one end to the another end of the ball circulation channel; and
   a control unit arranged to drive and control the electric motor,
   wherein the control unit comprises:
      a steering torque signal receiver configured to receive a signal indicative of a steering torque generated in the steering unit;
      a command signal calculator configured to calculate an electric motor command signal for drive control of the electric motor based on the steering torque signal; and
      an abnormality detection circuit configured to use the steering torque, the electric motor command signal or a motor current flowing in the electric motor as steering force information and judge the occurrence of an abnormality in the power steering device when a value of the steering force information periodically changes in a predetermined frequency range, which is higher than or equal to a first frequency and lower than or equal to a second frequency, and the value of the steering force information in the predetermined frequency range becomes higher than a predetermined value; and
a limiter circuit configured to limit the electric motor command signal to be larger than or equal to a predetermined upper limit value; and
wherein the abnormality detection circuit is configured to, for judgement of the abnormality, not use the value of the steering force information under a condition that the electric motor command signal is being limited by the limiter circuit.

2. The power steering device according to claim 1,
wherein the abnormality detection circuit is configured to judge the occurrence of the abnormality in the power steering device based on an average of peak values of the steering torque, the electric motor command signal or the motor current in the predetermined frequency range.

3. The power steering device according to claim 1,
wherein the abnormality detection circuit is configured to, for judgment of the abnormality, not use the value of the steering force information at frequencies lower than the first frequency.

4. The power steering device according to claim 3,
wherein the control unit includes a steering speed signal receiver configured to receive a signal indicative of a rotation speed of the steering wheel as a steering speed; and
wherein the first frequency is set higher than a frequency level at which intentional steering by a driver is possible.

5. The power steering device according to claim 1,
wherein the abnormality detection circuit is configured to, for judgment of the abnormality, not use the value of the steering force information at frequencies higher than the second frequency.

6. The power steering device according to claim 1,
wherein the control unit includes a steering speed signal receiver configured to receive a signal indicative of a steering speed; and
wherein the abnormality detection circuit is configured to, for judgment of the abnormality, not use the value of the steering force information under a condition that the steering speed is lower than a first steering speed.

7. The power steering device according to claim 6,
wherein the abnormality detection circuit is configured to, for judgment of the abnormality, not use the value of the steering force information during straight running of the vehicle.

8. The power steering device according to claim 7,
wherein the steering speed signal is calculated based on a rotation speed of the electric motor.

9. The power steering device according to claim 1,
wherein the control unit includes a steering speed signal receiver configured to receive a signal indicative of a steering speed; and
wherein the abnormality detection circuit is configured to, for judgment of the abnormality, not use the value of the steering force information under a condition that the steering speed is higher than or equal to a second steering speed.

10. The power steering device according to claim 1,
wherein the abnormality detection circuit is equipped with an abnormality detection counter such that a value of the abnormality detection counter is incremented when the value of the steering force information in the predetermined frequency range becomes higher than the predetermined value; and
wherein the abnormality detection circuit is configured to determine the occurrence of the abnormality in the power steering device when the value of the abnormality detection counter reaches a predetermined counter value.

11. The power steering device according to claim 10,
wherein the value of the abnormality detection counter is decremented when the value of the steering force information in the predetermined frequency range becomes lower than the predetermined value.

12. The power steering device according to claim 1,
wherein the abnormality detection circuit is configured to determine the occurrence of the abnormality in the power steering device when the abnormality is detected over a plurality of trips, assuming that one trip is a period from turn-on to turn-off of an ignition switch of the vehicle.

13. The power steering device according to claim 1,
wherein the abnormality detection circuit has a filter circuit configured to extract the value of the steering force information in the predetermined frequency range.

14. The power steering device according to claim 1,
wherein the control unit includes a vehicle speed signal receiver configured to receive a signal indicative of a running speed of the vehicle; and
wherein the abnormality detection circuit is configured to, for judgment of the abnormality, not use the value of the steering force information under a condition that the running speed of the vehicle is higher than or equal to a predetermined value.

15. The power steering device according to claim 1,
wherein the control device comprises a microcomputer in which the abnormality detection circuit is provided and which is configured to be loaded with a program;
wherein the microcomputer is configured to process the steering force information as digital data; and
wherein the second frequency is set higher than a resolution of the digital data of the steering force information or a resolution of a microprocessor of the microcomputer.

16. A control device for a power steering device,
the power steering device comprising:
a steering unit having a steering shaft rotatable with rotation of a steering wheel of a vehicle; and a rack bar made of an iron-based metal material and axially movable in response to rotation of the steering shaft;
an electric motor arranged to apply a steering force to the steering unit; and
a ball-screw mechanism arranged as a reduction unit between the steering unit and the electric motor so as to transmit a torque of the electric motor to the steering unit, the ball-screw mechanism including:
a steerable wheel-side ball screw groove helically recessed in an outer circumferential surface of the rack bar;
a nut made of an iron-based metal material in an annular shape and arranged to surround the rack bar and be rotatable relative to the rack bar;
a nut-side ball screw groove helically recessed in an inner circumferential surface of the nut to define a ball circulation channel with the steerable wheel-side ball screw groove;

a plurality of balls made of an iron-based metal material and arranged in the ball circulation channel; and a circulation member connecting one end to another end of the ball circulation channel so as to allow circulation of the plurality of balls from the one end to the another end of the ball circulation channel, the control device comprising:

a steering torque signal receiver configured to receive a signal indicative of a steering torque generated in the steering unit;

a command signal calculator configured to calculate an electric motor command signal for drive control of the electric motor based on the steering torque signal;

an abnormality detection circuit configured to use the steering torque, the electric motor command signal or a motor current flowing in the electric motor as steering force information and judge the occurrence of an abnormality in the power steering device when a value of the steering force information periodically changes in a predetermined frequency range, which is higher than or equal to a first frequency and lower than or equal to a second frequency, and the value of the steering force information in the predetermined frequency range becomes higher than a predetermined value; and a limiter circuit configured to limit the electric motor command signal to be larger than or equal to a predetermined upper limit value, wherein the abnormality detection circuit is configured to, for judgement of the abnormality, not use the value of the steering force information under a condition that the electric motor command signal is being limited by the limiter circuit.

17. The control device for the power steering device according to claim 16, wherein the abnormality detection circuit is configured to, for judgment of the abnormality, not use the value of the steering force information at frequencies higher than the second frequency.

18. A power steering device, comprising:

a steering unit having a steering shaft rotatable with rotation of a steering wheel of a vehicle; and a rack bar made of an iron-based metal material and axially movable in response to rotation of the steering shaft;

an electric motor arranged to apply a steering force to the steering unit;

a ball-screw mechanism arranged as a reduction unit between the steering unit and the electric motor so as to transmit a torque of the electric motor to the steering unit, the ball-screw mechanism including:

a steerable wheel-side ball screw groove helically recessed in an outer circumferential surface of the rack bar;

a nut made of an iron-based metal material in an annular shape and arranged to surround the rack bar and be rotatable relative to the rack bar;

a nut-side ball screw groove helically recessed in an inner circumferential surface of the nut to define a ball circulation channel with the steerable wheel-side ball screw groove;

a plurality of balls made of an iron-based metal material and arranged in the ball circulation channel; and a circulation member connecting one end to another end of the ball circulation channel so as to allow circulation of the plurality of balls from the one end to the another end of the ball circulation channel; and a controller arranged to drive and control the electric motor, the controller comprising:

a steering torque signal receiver configured to receive a signal indicative of a steering torque generated in the steering unit;

a command signal calculator configured to calculate an electric motor command signal for drive control of the electric motor based on the steering torque signal; and an abnormality detection circuit configured to use the steering torque, the electric motor command signal or a motor current flowing in the electric motor as steering force information and judge the occurrence of an abnormality in the power steering device when a value of the steering force information periodically changes in a predetermined frequency range, which is higher than or equal to a first frequency and lower than or equal to a second frequency, and the value of the steering force information in the predetermined frequency range becomes higher than a predetermined value;

wherein the abnormality detection circuit is equipped with an abnormality detection counter such that a value of the abnormality detection counter is incremented when the value of the steering force information in the predetermined frequency range becomes higher than the predetermined value and such that the value of the abnormality detection counter is decremented when the value of the steering force information in the predetermined frequency range becomes lower than the predetermined value; and wherein the abnormality detection circuit is configured to determine the occurrence of the abnormality in the power steering device when the value of the abnormality detection counter reaches a predetermined counter value.

19. A power steering device, comprising:

a steering unit having a steering shaft rotatable with rotation of a steering wheel of a vehicle; and a rack bar made of an iron-based metal material and axially movable in response to rotation of the steering shaft;

an electric motor arranged to apply a steering force to the steering unit;

a ball-screw mechanism arranged as a reduction unit between the steering unit and the electric motor so as to transmit a torque of the electric motor to the steering unit, the ball-screw mechanism including:

a steerable wheel-side ball screw groove helically recessed in an outer circumferential surface of the rack bar;

a nut made of an iron-based metal material in an annular shape and arranged to surround the rack bar and be rotatable relative to the rack bar;

a nut-side ball screw groove helically recessed in an inner circumferential surface of the nut to define a ball circulation channel with the steerable wheel-side ball screw groove;

a plurality of balls made of an iron-based metal material and arranged in the ball circulation channel; and a circulation member connecting one end to another end of the ball circulation channel so as to allow circulation of the plurality of balls from the one end to the another end of the ball circulation channel; and a controller arranged to drive and control the electric motor, the controller comprising:

a steering torque signal receiver configured to receive a signal indicative of a steering torque generated in the steering unit;

a command signal calculator configured to calculate an electric motor command signal for drive control of the electric motor based on the steering torque signal;

an abnormality detection circuit configured to use the steering torque, the electric motor command signal or a motor current flowing in the electric motor as steering force information and judge the occurrence of an abnormality in the power steering device when a value of the steering force information periodically changes in a predetermined frequency range, which is higher than or equal to a first frequency and lower than or equal to a second frequency, and the value of the steering force information in the predetermined frequency range becomes higher than a predetermined value; and a microcomputer in which the abnormality detection circuit is provided and which is configured to be loaded with a program;

wherein the microcomputer is configured to process the steering force information as digital data; and wherein the second frequency is set higher than a resolution of the digital data of the steering force information or a resolution of a microprocessor of the microcomputer.

* * * * *